United States Patent [19]
Mines et al.

[11] 4,124,267
[45] Nov. 7, 1978

[54] MOUNTING CLIP FOR A CONNECTOR

[75] Inventors: Gordon L. Mines, Elmhurst; Aldo J. Consiglio, Chicago, both of Ill.

[73] Assignee: TRW Inc., Elk Grove Village, Ill.

[21] Appl. No.: 822,426

[22] Filed: Aug. 8, 1977

[51] Int. Cl.² ............................................. H02B 1/04
[52] U.S. Cl. ............................... 339/125 R; 248/27.3; 339/139
[58] Field of Search ............... 248/27.3; 339/128, 132, 339/139, 75 M, 91 R, 176 MP, 125

[56] References Cited
U.S. PATENT DOCUMENTS 3,279,727 10/1966 Buttriss ............................... 248/27.3

Primary Examiner—Roy Lake
Assistant Examiner—E. F. Desmond
Attorney, Agent, or Firm—Neuman, Williams, Anderson & Olson

[57] ABSTRACT

A mounting clip is provided which is adapted to mount an electrical connector or the like in a cutout in a mounting panel. The clips are mounted in place on the panel in pairs and securely engage end portions of a clip by a simple "snap" action without the need for tools or securing means such as screws or the like. The connector is readily disengaged from one of the clips by a simple clip-bending step effected by a tool such as a screwdriver, pen knife or the like, so as to free one connector end, whereafter the opposed connector end may be readily slid from engagement with the remaining clip without damaging the connector or the clips whereby they may be reused indefinitely.

12 Claims, 4 Drawing Figures

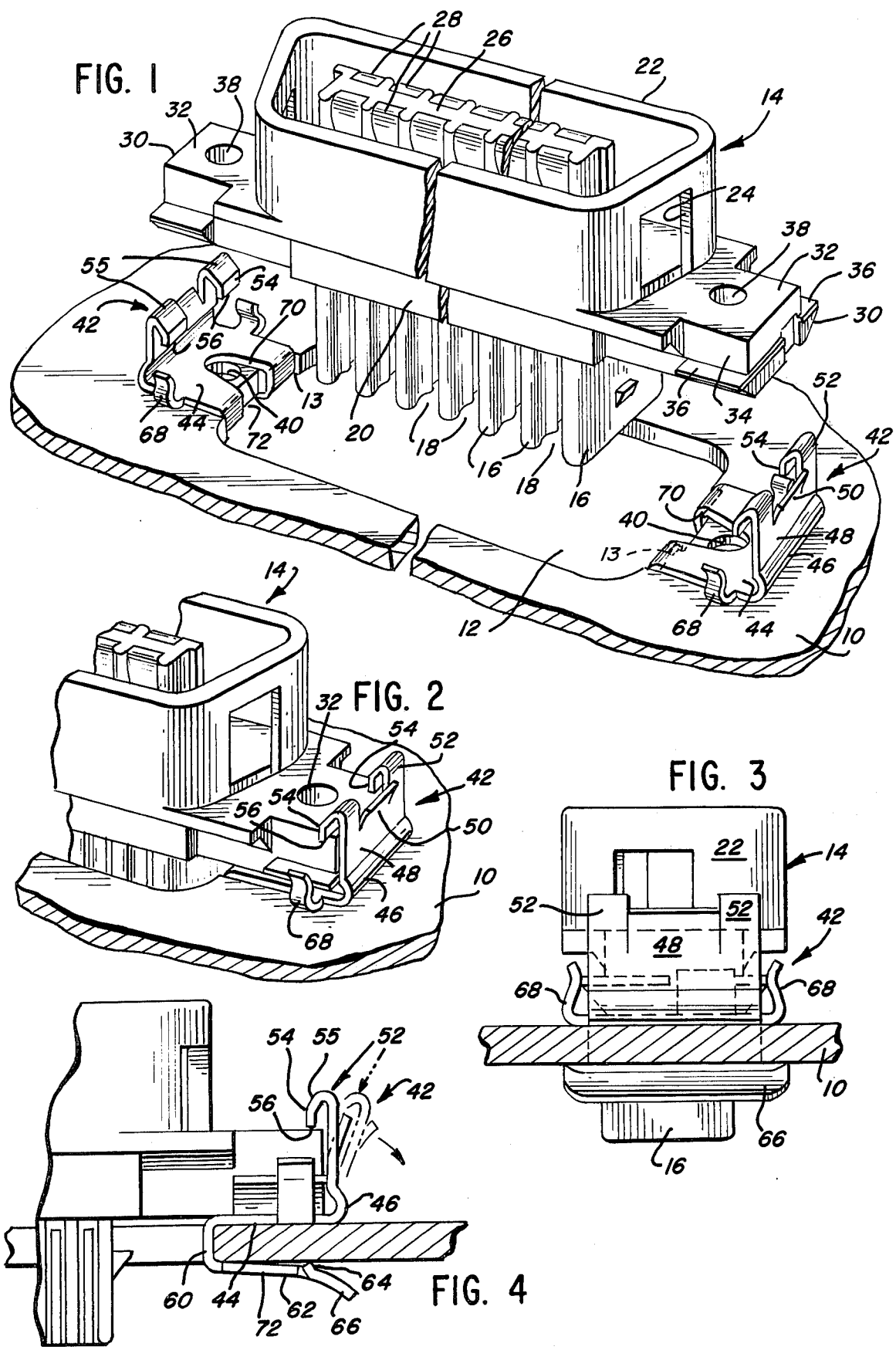

MOUNTING CLIP FOR A CONNECTOR

This invention relates to a novel clip construction for mounting electrical connectors on panels or a chassis by a simple snap action. The provided clips are secured to a panel and engage opposed ends of a connector without the need for securing means or tools.

The clips hereinafter described are adapted to be employed in mounting so-called miniature ribbon termination systems or high density systems in which a plurality of conductors are terminated in closely adjacent relationship. Such connectors include those manufactured by TRW Inc. of Elk Grove Village, Illinois and referred to as Cinch Superibbon Connectors.

The use of discrete securing means such as nut and bolt assemblies, screws and the like for securing a connector to a support chassis is well-known in the connector art. Such securing means traverse apertured end portions of such connector and the chassis to be engaged. Kirby U.S. Pat. No. 3,824,552 discloses the use of a connector having chassis-engaging clip members secured to exposed connector ends by rivets or the like.

In McKee application Ser. No. 736,895, filed Oct. 29, 1976, mounting clips of the type hereinafter described for pre-attachment to a panel are disclosed which are of differing construction requiring different modes of assembly with a connector, as well as different relative movements in the course of clip-connector disengagement.

It is an object of this invention to provide improved clip means for mounting a connector in a chassis opening which assures a stable interlock between the engaged elements while providing easy and instantaneous interlocking engagement between the clips and connector by means of a simple "snap" action.

It is another object of this invention to provide a connector mounting clip adapted to readily release an engaged connector. Such release is to be effected by means of a bending operation in which a lip wall is easily levered out of engagement with a connector terminal end by means of a simple tool such as a screwdriver blade, pen knife or the like.

It is a further object of the invention to provide a unitary connector mounting clip which may be readily and inexpensively produced simply by stamping and bending a sheet metal blank.

The above and other objects of this invention will become apparent from the following detailed description when read in the light of the accompanying drawing and appended claims.

In accordance with this invention the hereinafter described clips are mounted in pairs on opposed peripheral portions of a chassis cutout for releasably engaging opposed ends of a ribbon connector. Each clip of such a connector-mounting pair comprises a base adapted to rest on a chassis peripheral portion defining an opening in which conductor-engaging portions of a connector will be received. The clip base is joined to an upstanding wall portion adapted to resiliently engage a connector end limit; reverse bend fingers defining spaced terminal wall portions function as retaining means preventing upward movement of the connector relative to the clip base without first bending the wall and retaining fingers out of engagement with the connector end. Vertical tab fingers formed with opposed side edges of the clip base guide the connector end into position and limit lateral movement of such connector end. A reverse bend clamp blade attached to the base edge oppositely disposed to the clip wall resiliently and releasably secures the clip to a chassis edge portion.

For a more complete understanding of this invention reference will now be made to the drawing wherein:

FIG. 1 is a fragmentary perspective view of connector mounting clips made in accordance with this invention disposed in opposed relationship on the periphery of a chassis opening. A ribbon connector is also illustrated, prior to downward movement into engagement with the illustrated clips;

FIG. 2 is a fragmentary perspective view of one end portion of the elements of FIG. 1 in assembled relation;

FIG. 3 is a fragmentary end elevational view of the components illustrated in FIG. 2; and FIG. 4 is a fragmentary side elevational view of the elements illustrated in FIG. 2.

Referring now more particularly to FIG. 1 a chassis 10 is fragmentarily illustrated having a rectangular opening 12 formed therein adapted to receive a connector 14. Connector 14 comprises a plug or male connector having a plurality of parallel barrier portions 16 which define interposed conductor-receiving channels 18 in which metal contact elements are disposed for purposes of engaging conductors of wires in electrical contact.

Each barrier 16 extends from a central connector body portion 20 having an upper skirt-like portion 22 with a latch-receiving opening 24 disposed at each end thereof. Skirt portion 22 encompasses a central plastic rib 26 upon which mating contact portions 28 are disposed in opposed rows for purposes of engaging corresponding mating contact portions of a connector receptacle in a manner well-known in the art.

The connector 14 illustrated in FIG. 1 is formed of an electrically insulating plastic material with the exception of the metallic contacts mounted therein. Connector 14 is of an advantageous design manufactured by TRW Inc. of Elk Grove Village, Illinois and sold under the trademark SUPERIBBON.

Connectors of the same general type as connector 14 of the drawing and commonly referred to as ribbon connectors, are manufactured by a number of other manufacturers. Such connectors are adapted to be employed in so-called miniature termination systems or high density systems in which a plurality of wires are terminated in close relationship with one another.

The illustrated connector 14 fragmentarily illustrated in FIG. 1 is presented by way of example only. Connectors having such basic construction may contain varying numbers of barrier portions and channels defined thereby so as to accommodate varying numbers of conductors. Thus connectors of the illustrated type may have an adequate number of channels to accommodate 14, 24, 36, 50, 64, etc. electrically conductive wires. They also may be of female or receptacle design wherein the contact portions 28 are disposed about a central opening and designed to mate with a connector such as male connector 14. It will also be appreciated that clips in accordance with this invention may be used with connectors of other designs.

It will be further noted from FIG. 1 that opposed end portions 30 of the illustrated connector 14 are of precisely the same construction having an upper planar surface 32, side edge surfaces 34 and lower, laterally projecting beveled ear portions 36. Each end portion 30 may have a centrally disposed aperture 38 formed therein so that a securing means such as the screw, bolt or the like may traverse the same when the connector is to be joined to a connector or other device of prior designs requiring separate fasteners.

In the earlier connectors of the type represented by connector 14, the same were mounted in cutouts disposed in a mounting panel or chassis by means of screws, nut and bolt assemblies and the like which traversed apertured end portions of the connectors as well as the peripheral portions of such mounting chassis. Thus it will be noted in FIG. 1 of the drawing that chassis 10 has opposed mounting openings 40 for reception of screws, bolts or the like which could traverse apertures 38 of the connector 14 as well as the chassis openings 40 in the course of securing the ends of the connector in place on the chassis.

Although apertures 38 and 40 have been above described as enabling securing means to traverse the connector and chassis, mounting clips 42 do not require the use of any securing means for purposes of securely mounting the connector 14 to chassis plate 10. It is believed apparent that the use of such discrete securing means not only entails additional cost by way of the securing means employed, but also a labor cost incurred in the time consumed in assembling the components with the securing means. Mounting clips of the type disclosed herein which do not require securing means for connector engagement are disclosed in the aforementioned McKee application 736,895. The clips of this application define various improvements and advantages over the clips of such co-pending application.

In accordance with this invention, ribbon-type connectors of the type exemplified by connector 14 of FIG. 1 may be readily and securely mounted in place by means of novel mounting clip 42 illustrated in the various views of the drawing. Each clip 42 comprises a base portion 44 adapted to rest upon a surface portion of a chassis and which is integrally formed by means of an arcuate bend joint 46 with an upstanding wall portion 48. Bend 46 prevents a cracking or fracturing strain from being imparted to the base-wall juncture.

Cut from an upper central portion of wall 48 is a tab 50 which is bent outwardly as illustrated in FIGS. 1 and 2, away from opening 12 of the chassis 10 in which a connector such as illustrated connector 14 is to be mounted. It will be noted from FIG. 1 that opposed ends of chassis opening 12 have reduced neck portions 13 to snugly receive the innermost end portion of the clip base portion 44 therebetween; such base-chassis engagement provides centering of the opposed clips 42. As an alternative centering structure, the innermost edges of the clip base portions may be of substantially the same width as the chassis opening 12 so as to be snugly received therein. Using such alternative centering structure, the chassis opening could be rectangular in shape.

Disposed to either side of tab 50 in the normal position of clip use such as is illustrated in the drawings, are vertical fingers 52 having reverse bend terminal portions 54 (FIG. 2) possessing distal edges 56 which are substantially coplanar. Each finger 52 has a downwardly inclined surface 55 for reasons which will be hereinafter discussed.

Referring now more particularly to FIG. 4, it will be noted that clip base portion 44 is integrally formed at its innermost portion with a connecting clip portion 60 by means of a substantially right angle juncture. Clip portion 60 has a height which is substantially equivalent to the thickness of the chassis 10 as illustrated in FIG. 4 and defines a bight portion of the generally C-shaped section 44, 60, 62. Clip portion 60 is also integrally formed with the terminal, clamping blade portion 62. Portion 62 has a tang 64 cut therefrom and a distal outwardly curved or flared terminal edge portion 66 as is also most clearly seen from FIG. 4 of the drawing. Tang 64 provides a stop preventing slidable disengagement of clip 42 from chassis 10 without first lifting blade portion 62 from engagement with the chassis.

Clamp portion 62 of the clip 42 is normally disposed at an acute angle to the overlying clip base portion 44 so as to require a resilient bending or "springing apart" of the clip portion 60 as the same is spread from the remaining clip portion by grasping the terminal curved portion 66. In the clamp-spread condition, the thickness of the chassis 10 may be received, thereby enabling clip 42 to be mounted on a peripheral edge portion of the chassis 10 in the manner illustrated in the various views of the drawing.

Also integrally formed with base portion 44 of clip 42 are opposed guide tabs 68 which extend inwardly and upwardly from the base portion 44 of the clip with which integrally formed, generally parallel to the wall portion 48. Each tab 68 has a substantially S-shaped configuration as is most apparent from FIG. 3 of the drawing. Tabs 68 facilitate guiding end portions 30 of connectors 14 into interlocking engagement with the clips 42 of which forming a part and prevent lateral "play" or connector movement relative to the connector. Tabs 68 may also be of planar configuration in the vertical plane or slightly convergent, as such forms also assure resilient engagement with opposed outermost edges of connector ears 34.

A notch 70 is formed in base portion 44 of the clip 14 as is most clearly seen from FIG. 1 of the drawing so as to leave completely exposed underlying chassis plate opening 40 which has been formed to align with connector aperture 38 in the normal course of connector clip plate assembly. A matching notch 72 is formed therebeneath in clip blade portion 62. These notches assure access to opening 40. In the event a connector is employed with the illustrated chassis 10 and clips 42 which requires the utilization of a separate securing means such as a screw or nut and bolt assembly for locking such connector securely in place on the chassis as noted above, the clip 42 may be allowed to remain in place with such a connector. Thus, by being provided with notches 70 and 72 it is not necessary to remove clip 42 even through the same is not employed with connectors of the type illustrated in the drawing.

As was previously discussed in some detail, the clips of this invention require no discrete securing means for being mounted and placed in position on the periphery of a chassis opening and, in addition, require no securing means for effecting an interconnection with a connector such as illustrated connector 14 of the drawing.

Assembly of connector 14 to the opposed clips 42 is an extremely simple matter. Connector 14 may be moved downwardly at right angles to the chassis opening 12 so that the end portion having channels 18 and contacts, with or without conductors terminated therein, pass through chassis opening 12. In this connection it should be noted that the utilized clips 42 enable the connector 14 to either initially approach the clips from above the plate in the manner indicated in FIG. 1 or from below the plate. Thus, if the particular installation so requires, the connector 14 may pass through opening 12 of chassis plate 10 from the bottom by a tilted or slightly endwise movement, traversing opening 12 with the wires terminated therein, whereafter the connector may then be moved downwardly to engage the opposed clips 42.

The clip-engaging procedure merely requires downward movement of the opposed connector ends 30 so that the distal end limits thereof strike the downwardly slanted surfaces 55 of each reverse bend finger portion 54, pivoting the same outwardly into the dotted line positions illustrated in FIG. 4. The connector proceeds downwardly until opposed end portions 30 rest on the base portions 44 of the opposed clips. In such position, terminal distal end limits 56 of the reverse bend finger portions 54 snap over surfaces 32 of the connector end portions 30 so as to snugly retain the connector therebeneath in the manner illustrated in FIG. 4.

With this snapping action, the fingers 52 return from their outwardly bent dotted line positions in FIG. 4 to their substantially vertical, full-line position. The interval between the opposed S-shaped tab portions 68 is such that the maximum width defined by the laterally projecting ears 36 of the connector ends 30 is snugly received between the innermost portions of the tabs 68 in the manner illustrated in FIG. 3. Thus connector 14 is securely mounted in place between the opposed clips 42, being prevented from moving in the vertical plane by means of reverse bend finger portions 54 of the clips 42, and being prevented from laterally moving by means of the resiliently mounted tab portions 68 of such clips.

As a modification to the straight downward movement of the connector 14 for purposes of engaging the opposed clips 42, one clip end portion 30 may be inserted beneath the terminal distal edges 56 of detent portions 54 of clip fingers 52 of one clip 42, whereafter the opposed connector end 32 is pivoted downwardly so as to urge the opposed fingers 52 of the other clip 42 outwardly for snap engagement thereunder.

Although connector 14 is illustrated in FIG. 1 with the wire-receiving channels 18 disposed lowermost for purposes of traversing plate aperture 12, the illustrated connector may, of course, be mounted in an inverted position in which the skirt portion 22 is disposed lowermost in the chassis aperture 12. The receiving aperture of the chassis in which mounted, however, in order to receive the connector in such inverted position must be predeterminately formed so as to appropriately receive the inverted connector. In the inverted position, the connector end portions 30 will be received in the opposed clips 42 in the manner above described.

Although the disclosed connector 14 of the drawing comprises a plug, the illustrated clips 42 will, of course, work to equal advantage if a connector receptacle having similar end portions is employed and mounted on a chassis.

The material of fabrication of the illustrated clips 42 is preferably sheet steel approximately 0.015 inch thick bearing the designation of the American Iron and Steel Institute "1050 annealed." The stamped and formed clips made in accordance with this invention are heat treated to a Rockwell C hardness ($R_C$) of 47 ± 2. Such clips may also be plated for corrosion resistance and if plated as by zinc plating, such clips should be heat treated thereafter at approximately 400° F. for three to four hours to minimize hydrogen embrittlement.

The clips 42 of this invention are reusable. When it is desired to remove a mounted connector from engagement with opposed clips 42, all that need be done is insert the blade of a screwdriver or pen knife between the inner surface of tab 50 of one clip 42 and the adjacent end of the connector, and bend or lever the entire clip wall 48 outwardly away from the engaged connector end into the dotted line position of FIG. 4. With the clip wall in such position the connector end may be moved in the vertical plane by the same prying action. The clip end is moved outward until it clears the reverse bend retaining detents 54 of the clip. It is then an easy matter to readily slip the opposed end of the connector from engagement with the opposed clip member 42.

As was above mentioned, the provided clips are adapted to be employed with different size connectors of the type illustrated in the drawing. By way of example only, a clip made in accordance with this invention may have the following dimensions. Base portion 44 may have a length, that is the dimension extending parallel to the longitudinal axis of the connector mounted therein, of approximately 0.34 inch and a width of approximately 0.47 inch. Fingers 52 may be approximately 0.3 inch high, with terminal distal edges 56 of the fingers 54 disposed approximately 0.22 inch from the surface of the underlining base 44. The opposed tabs 68 may be approximately 0.15 inch high, and arcuate connection 46 between the clip base and wall portion 48 may be formed about a radius of 0.03 inch.

Removal of each clip 42 from the periphery of the chassis plate opening is a relatively simple matter. All that need be done is grasp the flared terminal end 66 of the underlying clamp portion 62 and urge such clamp portion away from the overlying clip portion to free the tang 64 from engagement with the undersurface of the chassis, enabling the clip to be removed from the periphery of the chassis opening 12.

It is thus apparent from the foregoing description that a novel mounting clip has been provided which requires no discrete means for securing the clips in place on a chassis and, in addition, requires no securing means for engaging and retaining in desired locking relationship a connector of the type disclosed in this application.

It is thus seen that the provided clips may be readily inserted in place, readily engage a connector to be mounted on the chassis, be readily disengaged from the engaged connector and be readily disengaged from the chassis periphery on which mounted. The provided clip may remain in place on a chassis opening periphery even though a connector construction not compatible for an interlocking interfit therewith is employed. Such universality dispenses with the need for clip removal and permits the use of discrete securing means in the event such are necessary or desirable in connection with the connector construction employed.

It is believed apparent from the foregoing description that modifications may be made in the disclosed clip construction which remain within the ambit of the invention disclosed. Accordingly, this invention is to be limited only by the scope of the appended claims.

What is claimed is:

1. A mounting clip for securing a connector to a chassis, comprising a base; a wall portion connected to said base along one base edge and having at least one terminal portion in superposed spaced relation to said base; opposed guide means formed with opposed edges of said base separated by said one base edge and extending in the same direction therefrom as said wall portion; said wall portion being resiliently movable relative to said base and having a segment cut therefrom and bent away from said clip base portion, said segment being formed from a clip wall portion adjacent said wall terminal portion.

2. A mounting clip as in claim 1 wherein said guide means extend generally parallel to said wall portion from opposed edges of said base.

3. A mounting clip as in claim 1 wherein said guide means extend generally parallel to said wall portion from opposed edges of said base.

4. The mounting clip of claim 1 in which said segment is formed from a wall portion interposed two terminal wall portions.

5. The mounting clip of claim 1 in which said guide means comprise opposed tabs extending in the direction of said terminal portions and are of substantially S-shaped configuration.

6. The mounting clip of claim 1 in which said wall portion in superposed spaced relation to said base comprises at least one reverse bend terminal portion at the distal end of said wall portion.

7. The mounting clip of claim 1 in which said wall terminal portion has an upper guide surface extending upwardly and outwardly relative to said base contiguous with said wall terminal portion.

8. The mounting clip of claim 1 in combination with resilient attachment means connected to an edge of said clip base oppositely disposed to the wall portion-base connection for detachably securing said clip to an opening-defining portion of a chassis or the like.

9. The mounting clip of claim 8 in which said resilient attachment means comprises a blade extending beneath said clip base by means of a reverse bend connection with said base, and a tang cut from said blade and bent in the direction of said clip base adapted to engage a chassis surface on which said clip is mounted and resist chassis-blade disengagement.

10. A mounting clip for a connector having opposed end portions extending from an interposed body portion in which a plurality of wire-engaging contacts are mounted; each connector end portion having laterally projecting portions spaced apart by means of an interposed planar portion integrally formed therewith; said clip having a base portion adapted to be mounted on a support surface; a projecting wall extending from said base portion and resiliently movable relative thereto; guide portions extending from opposed edges of said clip base portion in the same general direction as said projecting wall; said projecting wall extending from an edge of said clip base portion extending between ends of said clip opposed edges; the interval between distal ends of said guide portions being wider than the width defined by such connector laterally projecting portions and having contiguous guide portions with an interval therebetween narrower than the width defined by such connector laterally projecting portions; said contiguous guide portions being such as to snugly receive laterally projecting portions of a connector end portion therebetween; a portion of said wall spaced from said base portion overlying said base portion for retaining such a connector end portion to said clip.

11. A unitary mounting clip for securing a connector to a chassis comprising: a base of generally C-shaped configuration for slidably engaging an edge portion of such a chassis; a wall portion extending generally normal to said base from the distal edge of one leg of such C-shape; said wall portion including at least one retaining segment in superposed spaced relation with said base, and an upper guide surface extending angularly upward and outward, relative to said base, over said retaining segment for guiding a connector end into engagement beneath said retaining segment; guide portions for positioning a connector end laterally of said base generally in alignment with said wall portion during and after such engagement, and a tab cut from said wall portion and bent away from said base to provide access by a tool for prying said wall portion away from an engaged connector.

12. A mounting clip for a connector having opposed end portions extending from an interposed body portion in which a plurality of wire-engaging contacts are mounted; each connector end portion having laterally projecting portions spaced apart by means of an interposed planar portion integrally formed therewith; said clip having a base portion adapted to be mounted on a support surface; a projecting wall extending from said base portion and resiliently movable relative thereto; guide portions extending from opposed edges of said clip base portion in the same general direction as said projecting wall; said projecting wall extending from an edge of said clip base portion extending between ends of said clip opposed edges; the interval between said guide portions being such as to snugly receive laterally projecting portions of a connector end portion therebetween; portions of said wall spaced from said base portion overlying said base portion for overlying and retaining such a connector end portion, and a tab cut from said projecting wall and bent outwardly opposite to the clip base portion whereby said projecting wall may be flexed by engaging said tab and urging the tab and connected wall away from the clip base portion.

* * * * *

UNITED STATES PATENT AND TRADEMARK OFFICE
CERTIFICATE OF CORRECTION

PATENT NO. : 4,124,267
DATED : November 7, 1978
INVENTOR(S) : Gordon L. Mines and Aldo J. Consiglio It is certified that error appears in the above-identified patent and that said Letters Patent are hereby corrected as shown below:

Cancel claim 3.

Change claim 4 to -- claim 3 --.

Change claim 5 to -- claim 4 --.

Change claim 6 to -- claim 5 --.

Change claim 7 to -- claim 6 --.

Change claim 8 to -- Claim 7 --.

Change claim 9 to -- claim 8 -- and change the dependency to claim 7.

Change claim 10 to -- claim 9 --.

Change claim 11 to -- claim 10 --.

Change claim 12 to -- claim 11 --.

Signed and Sealed this

Twenty-ninth Day of May 1979

[SEAL]

Attest:

RUTH C. MASON
Attesting Officer

DONALD W. BANNER
Commissioner of Patents and Trademarks